United States Patent [19]

Plachetta et al.

[11] Patent Number: 5,030,689

[45] Date of Patent: Jul. 9, 1991

[54] THERMOPLASTIC MOLDING COMPOSITIONS BASED ON POLYAMIDE MIXTURES

[75] Inventors: Christoph Plachetta, Limburgerhof; Walter Goetz, Kaiserslautern; Gerd Blinne, Bobenheim, all of Fed. Rep. of Germany

[73] Assignee: BASF Aktiengesellschaft, Ludwigshafen, Fed. Rep. of Germany

[21] Appl. No.: 260,039

[22] Filed: Oct. 20, 1988

[30] Foreign Application Priority Data

Oct. 20, 1987 [DE] Fed. Rep. of Germany ....... 3735404

[51] Int. Cl.$^5$ .............................................. C08L 77/00
[52] U.S. Cl. .................................... 525/66; 525/183; 525/184; 525/432
[58] Field of Search ................... 525/432, 183, 184, 66

[56] References Cited

U.S. PATENT DOCUMENTS

| | | | |
|---|---|---|---|
| 4,174,358 | 11/1979 | Epstein | 525/425 |
| 4,207,404 | 6/1980 | Coran et al. | 525/184 |
| 4,346,194 | 8/1982 | Roura | 525/66 |
| 4,423,186 | 12/1983 | Grigo et al. | 525/179 |
| 4,478,978 | 10/1984 | Roura | 525/66 |
| 4,556,696 | 12/1985 | Stewart et al. | 525/432 |
| 4,713,415 | 12/1987 | Lavengood et al. | 525/183 |
| 4,803,247 | 2/1989 | Altman et al. | 525/179 |

FOREIGN PATENT DOCUMENTS 0034704  9/1981  European Pat. Off. .

Primary Examiner—Ana L. Carrillo
Attorney, Agent, or Firm—Oblon, Spivak, McClelland, Maier & Neustadt

[57] ABSTRACT

Thermoplastic molding compositions contain as essential components (A) 10-89% by weight of a copolyamide of
 ($A_1$) 80-99% by weight of recurring units derived from adipic acid and hexamethylenediamine and
 ($A_2$) 1-20% by weight of units derived from ε-caprolactam,
(B) 10-80% by weight of polyhexamethyleneadipamide,
(C) 1-40% by weight of an impact-modifying rubber and in addition
(D) 0-60% by weight of a fibrous or particulate filler or a mixture thereof.

12 Claims, No Drawings

THERMOPLASTIC MOLDING COMPOSITIONS BASED ON POLYAMIDE MIXTURES

The present invention relates to thermoplastic molding compositions containing as essential components (A) 10-89 % by weight of a copolyamide of
 (A$_1$) 80-99 % by weight of recurring units derived from adipic acid and hexamethylenediamine and
 (A$_2$) 1-20 % by weight of units derived from $\epsilon$-caprolactam,
(B) 10-89 % by weight of polyhexamethyleneadipamide,
(C) 1-40 % by weight of an impact-modifying rubber and in addition
(D) 0-60 % by weight of a fibrous or particulate filler or a mixture thereof.

The present invention also relates to the use of such molding compositions for producing fibers, films and shaped articles and to shaped articles obtainable from the molding composition according to the invention as essential components.

Polyamides are widely used in many fields of application, for example in the automotive industry, for the manufacture of housings for electric instruments or in the building sector.

An important property which plays an essential part in many applications is the impact strength of the polyamide, in particular the multiaxial impact strength (which constitutes a more suitable criterion than the uniaxial impact strength of Izod or Charpy). What is demanded from polyamides is ductility under load; that is, in the event of fracture the cracks and weak points should ideally remain narrowly concentrated around the stressed area and not propagate.

U.S. Pat. No. -A-4,174,358 describes improving the impact strength of polyamide$ by adding random copolymers which enter an interaction with the polyamide. The impact properties of these products at low temperatures, however, are not totally satisfactory.

EP-A-34,704 discloses that mixtures of poly-$\epsilon$-caprolactam and polyhexamethyleneadipamide combined with certain rubbers have improved impact strengths compared with corresponding admixtures containing only one of the polyamides.

Owing to the relatively high poly-$\epsilon$-caprolactam content, the heat distortion resistance of the mixtures is much reduced compared with pure polyhexamethyleneadipamide, and this is a disadvantage.

It is an object of the present invention to provide thermoplastic molding compositions based on polyhexamethyleneadipamide as main component which have good impact strength properties, in particular a good multiaxial impact strength at low temperatures, and a good heat distortion resistance.

We have found that this object is achieved according to the invention with the thermoplastic molding compositions defined at the beginning.

As component (A), the molding compositions according to the invention contain 10-89, preferably 10-70, in particular 15-70, % by weight (based on the total weight of the molding composition) of a copolyamide based on $\epsilon$-caprolactam and adipic acid and hexamethylenediamine.

The recurring units derived from $\epsilon$-caprolactam (A$_2$)-account for 1-20, preferably 4-15, in particular 5-12, % by weight of the total weight of the copolyamide.

A small proportion of the $\epsilon$-caprolactam, preferably not more than 30 % by weight, may be replaced by other polyamide-forming monomers, preferably other lactams (not of course by adipic acid and hexamethylenediamine). Such monomers are known to those skilled in the art and described in the literature (for example in U.S. Pat. No. -A 4,174,358), so that no details are required here. Preferably, the units (A$_2$) derive exclusively from $\epsilon$-caprolactam.

As component (A$_1$), the copolyamides A) contain 80-99, preferably 85-96, in particular 88-92, % by weight of units deriving from adipic acid and hexamethylenediamine. Here too again up to 30 % by weight of these monomers may be replaced by other polyamide-forming monomers known for preparing polyamides (except $\epsilon$-caprolactam).

Particularly preferably, the units (A$_1$) are derived exclusively from adipic acid and hexamethylenediamine.

The copolyamides A can be prepared in the conventional manner for polyamides described in the literature or relevant handbooks (e.g. Kunststoff-Handbuch, vol. VI Polyamide, Carl Hanser Verlag 1966).

If $\epsilon$-caprolactam, adipic acid and hexamethylenediamine are reacted at the same time, then the copolyamide (A) contains the units (A$_1$) and (A$_2$) in random distribution. However, it is also possible, by separate timed addition of the monomers, to prepare block copolyamides containing blocks of units (A$_1$) and (A$_2$).

The relative viscosity of copolyamides (A) is in general within the range of 2.0-5.0, preferably from 2.2 to 4.5, measured in 96 % strength sulfuric acid at 25° C. (concentration: 1 g/100 ml).

As component (B), the molding compositions according to the invention contain 10-89, preferably 10-70, in particular 15-70, % by weight, based on the total weight of the molding compositions, of polyhexamethyleneadipamide. Corresponding products are commercially available (eg. Ultram ®A from BASF).

The relative viscosity of the polyhexamethyleneadipamide is in general, like that of copolyamides (A), within the range 2.0-5.0, preferably 2.2-4.5, measured in 96 % strength sulfuric acid at 25° C. (concentration: 1 g/100 ml).

As component (C), the molding compositions according to the invention contain from 1 to 40, in particular from 5 to 35, particularly preferably from 8 to 30, % by weight of a rubber.

In principle, any rubber is suitable which, mixed with polyamides, brings about an improvement in the impact strength compared with pure polyamide.

In general, such rubbers are copolymers which are preferably built up from at least two of the following monomers as main components: ethylene, propylene, butadiene, isobutene, isoprene, chloroprene, vinyl acetate, styrene, acrylonitrile and acrylic and methacrylic esters of from 1 to 18 carbon atoms in the alcohol component.

Rubbers containing reactive components which produce adhesion to the amine or carboxyl end groups on the polyamide are preferred. Suitable reactive components are olefinically unsaturated carboxylic acids and anhydrides thereof.

Rubbers (C) are described for example in HoubenWeyl, Methoden der organischen Chemie, vol. 14/1 (Georg-Thieme-Verlag, Stuttgart, 1961), pages 392 to 406, and in the monograph by C. B. Bucknall, Toughened Plastics (Applied Science Publishers, London, 1977).

In what follows, some preferred types of such elastomers are described.

The first preferred group are ethylene-propylene (EPM) and ethylene-propylene-diene (EPDM) rubbers which preferably have an ethylene:propylene ratio within the range from 40:60 to 90:10.

The Mooney viscosities (MLI+4/100° C.) of such uncrosslinked EPM and EPDM rubbers (gel contents in general below 1 % by weight) are preferably within the range from 25 to 100, in particular from 35 to 90 (measured on the large rotor after a running time of 4 minutes at 100° C in accordance with the German Standard Specification DIN 53,523).

EPM rubbers generally have virtually no double bonds any longer, while EPDM rubbers may have from 1 to 20 double bond$/100 carbon atoms.

Suitable diene monomers for EPDM rubbers are for example conjugated dienes such as isoprene and butadiene, non-conjugated dienes of from 5 to 25 carbon atoms, such as penta-1,4-diene, hexa-1,4-diene, hexa-1,5-diene, 2,5-dimethylhexa-1,5-diene and octa-1,4-diene, cyclic dienes such as cyclopentadiene, cyclohexadienes, cyclooctadienes and dicyclopentadiene, and also alkenylnorbornenes such as 5-ethylidene-2-norbornene, 5-butylidene-2-norbornene, 2-methallyl-5-norbornene, 2-isopropenyl-5-norbornene and tricyclodienes such as 3-methyltricyclo[5.2.1.0.2.6]-3,8-decadiene or mixtures thereof. Preference is given to 1,5-hexadiene, 5-ethylidenenorbornene and dicyclopentadiene. The diene content of EPDM rubbers is preferably from 0.5 to 50, in particular from 1 to 8, % by weight, based on the total weight of the rubber.

EPM and EPDM rubbers may preferably also be grafted with reactive carboxylic acids or derivatives thereof. Merely for illustration it is possible to mention acrylic acid, methacrylic acid and derivatives thereof, and maleic anhydride.

A further group of preferred rubbers are copolymers of ethylene with acrylic acid and/or methacrylic acid and/ or the esters of these acids. Additionally, the rubbers may also contain dicarboxylic acids, eg. maleic acid and fumaric acid or derivatives thereof, for example esters and anhydrides, and/or epoxy groups. These dicarboxylic acid derivatives and epoxy groups are preferably incorporated in the rubber by adding to the monomer mixture dicarboxyl- and epoxy-containing monomers of the general formulae I or II or III or IV $$R_1C(COOR_2)C=C(COOR_3)R_4 \quad (I)$$

$$\begin{matrix} R_1 & & R_4 \\ \diagdown & & \diagup \\ C & = & C \\ | & & | \\ CO & & CO \\ \diagdown & \diagup & \\ & O & \end{matrix} \quad (II)$$

$$CHR^7=CH-(CH_2)_m-O-(CHR^6)_n-CH\underset{O}{\overset{O}{\diagup\diagdown}}CHR^5 \quad (III)$$

$$CHR^9=CH-(CH_2)_p-CH\underset{O}{\overset{}{\diagup\diagdown}}CHR^8 \quad (IV)$$

where $R^1$–$R^9$ are each hydrogen or alkyl of from 1 to 6 carbon atoms, m is an integer from 0 to 20, n is an integer from 0 to 10, and p is an integer from 0 to 5.

Preferably, $R^1$–$R^7$ are each hydrogen, m is 0 or 1 and n is 1. The corresponding compounds are maleic acid, fumaric acid, maleic anhydride, alkyl glycidyl ethers and vinyl glycidyl ether.

Preferred compounds of the formulae I, II and III are maleic acid, maleic anhydride and epoxy-containing esters of acrylic acid and/or methacrylic acid, particular preference being given to glycidyl acrylate and glycidyl methacrylate.

The ethylene content of the copolymers is in general within the range from 50 to 98 % by weight, and the proportions of epoxy-containing monomers and of the acrylic and/or methacrylic ester are each within the range from 1 to 49 % by weight.

Particular preference is given to copolymers of from 50 to 98, in particular from 60 to 95, % by weight of ethylene, from 0.5 to 40, in particular from 3 to 20, % by weight of glycidyl acrylate and/or glycidyl methacrylate, acrylic and/or maleic anhydride, and from 1 to 45, in particular from 10 to 35, % by weight of n-butyl acrylate and/or 2-ethylhexyl acrylate.

Further preferred esters of acrylic and/or methacrylic acid are the methyl, the ethyl, the propyl and the i- or the t-butyl esters.

Besides these it is also possible to use vinyl esters and vinyl ethers as comonomers.

The above-described ethylene copolymers can be prepared in a conventional manner, for example by random copolymerization under high pressure at elevated temperatures. Appropriate methods are described in the literature.

The melt flow index of the ethylene copolymers is in general within the range from 1 to 80 g/10 min. (measured at 190° C. under a load of 2.16 kg).

Preferred elastomers (rubbers) C) also include graft copolymers with butadiene, butadiene/styrene, butadiene/acrylonitrile and acrylic esters, as described for example in DE-A-1,694,173 and DE-A-2,348,377.

Chief among them are the ABS polymers as described in DE-A-2,035,390, DE-A-2,248,242 and EP-A-22,216, the last being particularly preferred.

Rubber (C) may also be a graft polymer of from 25 to 98 % by weight of an acrylate rubber having a glass transition temperature of below $-20°$ C. as a grafting base (base polymer) and from 2 to 75 % by weight of a copolymerizable ethylenically unsaturated monomer whose homopolymers or copolymers have a glass transition temperature of more than 25° C. as a graft surface (graft sheath).

The grafting base comprises acrylate or methacrylate rubbers in which up to 40 % by weight of further comonomers may be present. The $C_1$–$C_8$-esters of acrylic acid and methacrylic acid and halogenated derivatives thereof and al$o aromatic acrylic esters and mixtures thereof are preferred. Suitable comonomers for the grafting base are acrylonitrile, methacrylonitrile, styrene, $\alpha$-methylstyrene, acrylamides, methacrylamides and vinyl $C_1$–$C_6$-alkyl ethers.

The grafting base may be uncrosslinked or partially or completely crosslinked. Crosslinking is obtained for example by copolymerization of preferably from 0.02 to 5 % by weight, in particular from 0.05 to 2 % by weight, of a crosslinking monomer having more than one double bond. Suitable crosslinking monomers are described for example in DE-A-2,726,256, DE-A-2,444,584 and EP-A-50,265.

Preferred crosslinking monomers are triallyl cyanurate, triallyl isocyanurate, triacryloylhexahydro-striazine and trialkylbenzenes.

If the crosslinking monomers have more than 2 polymerizable bonds, it is advantageous to restrict the quantity thereof to not more than 1 % by weight, based on the grafting base.

Particularly preferred grafting bases are emulsion polymers having a gel content of more than 60 % by weight (determined in dimethylformamide at 25° C. in accordance with M. Hoffmann, H. Krömer, R. Kuhn, Polymeranalytik, Georg-Thieme-Verlag, Stuttgart, 1977).

Other useful grafting bases are acrylate rubbers having a diene core as described for example in EP-A-50,262.

Suitable graft monomers are in particular styrene, ε-methylstyrene, acrylonitrile, methacrylonitrile and methyl methacrylate or mixtures thereof, in particular those of styrene and acrylonitrile in a weight ratio of from 1:1 to 9:1.

The grafting yields, i.e. the ratio of the amount of grafted-on monomer to the amount of graft monomer used, is in general within the range from 20 to 80 %.

Rubbers based on acrylates which may be used according to the invention are described for example in DE-A-2,444,584 and DE-A-2,726,256.

Rubbers (C) preferably have a glass transition temperature of below $-30°$ C., in particular below $-40°$ C.

It will be readily understood that it is also possible to use mixtures of the above-specified types of rubber.

Fibrous or particulate fillers are carbon fibers, glass fibers, glass balls, amorphous silica, asbestos, calcium silicate, calcium metasilicate, magnesium carbonate, kaolin, chalk, pulverulent quartz, mica, barium sulfate and feldspar. The proportion of these fillers is 0-60, preferably 5-50, % by weight, based on the total weight of the molding composition.

Besides the essential components (A) to (C) and any (D) the molding compositions according to the invention may contain customary additives and processing aids. Their proportion is in general up to 60, preferably up to 50, % by weight, based on the total weight of components (A) to (D).

Customary additives are for example stabilizers and oxidation retarders, agents against decomposition by heat and ultraviolet light, lubricants and mold release agents, colorants, such as dyes and pigments, nonreinforcing fillers, plasticizers and flameproofing agents.

Oxidation retarders and thermal stabilizers which may be added to the thermoplastic compositions according to the invention are for example halides of metals of group I of the periodic table, for example halides of sodium, potassium or lithium, with or without copper(I) halides eg. chlorides, bromides or iodides. It is also possible to use sterically hindered phenols, hydroquinones, substituted representatives of this group and mixtures thereof, preferably in concentrations up to 1 % by weight, based on the weight of the mixture.

Examples of UV stabilizers are various substituted resorcinols, salicylates, benzotriazoles and benzophenones, which in general are used in amounts of up to 2.0 % by weight.

Lubricants and mold release agents, which in general are added to the thermoplastic composition in amounts of up to 1 % by weight, are stearic acids, stearyl alcohol, alkyl stearates and stearamides and also esters of pentaerythritol with long-chain fatty acids.

Flameproofing agents are red phosphorus, the compounds of pentavalent phosphorus, melamine derivatives and the combinations described in EP-A-55,893.

The additives also include stabilizers which prevent the decomposition of red phosphorus (if the latter is used as a flameproofing agent) in the presence of moisture and atmospheric oxygen. Examples thereof are zinc oxide and cadmium oxide.

The molding compositions according to the invention can be prepared in a conventional manner by mixing the starting components in customary mixing apparatus, such as screw extruders, Brabender mills or Banbury mills, and then extruding. After extrusion the extrudate is cooled down and comminuted. The mixing temperatures are in general within the range from 220° to 300° C.

The molding compositions according to the invention are notable for excellent multiaxial impact strength (in particular total penetration energy) at low temperatures. Compared with admixtures of poly-ε-caprolactam and polyhexamethyleneadipamide (as described in EP-A-34,704) they are notable for an improved heat distortion resistance. This is attributable to the fact that the copolyamides containing a small proportion of units derived from ε-caprolactam have a higher melting point than poly-ε-caprolactam.

EXAMPLES

The following components were used:

Component A

Random copolyamide comprising 10 % by weight of units deriving from ε-caprolactam ($A_2$) and 90 % by weight of units deriving from adipic acid and hexamethylenediamine ($A_1$) and having a relative viscosity of 2.6 (measured in 96 % strength $H_2SO_4$ at 25° C.; concentration: 1 g/100 ml) (Ultramid ®KR 4040 from BASF).

Component B

Polyhexamethyleneadipamide having a relative viscosity of 2.6 (measured as in the case of A).

Component C

C1: Ethylene-propylene rubber (weight ratio ethylene/propylene about 75/25) containing 0.7 % by weight of copolymerized maleic anhydride units and a melt volume index (ml/10 min.) of 48, measured at 230° C. under a load of 21.6 kg (Exxelan ®1301 from Exxon Chemicals).

C2: Ethylene/n-butyl acrylate/acrylic acid terpolymer (weight ratio: 59.5:35:5.5) having a melt flow index of 10 g/10 min. (at 190° C.under a load of 2.16 kg).

Component D

Wollastonite (Wollastokup ®10012 from NYCO).

Components (A) to (C) and, if to be used, (D) were mixed and melted in an extruder at 290° C., and the homogeneous mixture was extruded and granulated. The granules were injection molded at a material temperature of 290° C. and a mold surface temperature of 80° C. into test specimens for determination of the multiaxial impact strength. The Plastechon test was carried out in accordance with German Standard Specification DIN 53,443 sheet 2.

The compositions and the measured results are shown in the table below.

TABLE

| | Composition (% by weight) | | | | Plastechon test at $-40°$ C. | |
|---------|----|----|--------|----|----------------------------------------|------------------------------------|
| Example | A  | B  | C      | D  | Damaging energy (to first crack) $W_s$ (N · m) | Total penetration energy $W_{ges}$ (N · m) |
| 1       | 30 | 50 | 20 $C_1$ | —  | 34 | 87 |
| 2       | 70 | 10 | 20 $C_1$ | —  | 39 | 98 |
| 3V      | 80 | —  | 20 $C_1$ | —  | 33 | 38 |
| 4V      | —  | 80 | 20 $C_1$ | —  | 39 | 54 |
| 5V      | 72 | —  | 8 $C_2$  | 20 | 6  | —  |
| 6       | 64 | 8  | 8 $C_2$  | 20 | 13 | —  |

V = comparative test

The Examples reveal that the molding compositions according to the invention have an appreciably improved total penetration energy compared with compositions containing only one of components (A) or (B).

We claim:

1. A thermoplastic molding composition of improved impact strength consisting essentially of:
   (A) 10-89% by weight of a copolyamide of
      ($A_1$) 80-99% by weight of recurring units derived from adipic acid and hexamethylenediamine and
      ($A_2$) 1-20% by weight of units derived from ε-caprolactam,
   (B) 10-89% by weight of polyhexamethylenedipamide,
   (C) 1-40% by weight of an impact-modifying rubber and in addition
   (D) 0-60% by weight of a fibrous or particulate filler or a mixture thereof.

2. A thermoplastic molding composition as claimed in claim 1, wherein copolyamide (A) is built up from
   ($A_1$) 85-96% by weight of recurring units deriving from adipic acid and hexamethylenediamine and
   ($A_2$) 4-15% by weight of recurring units derived from ε-caprolactam.

3. A thermoplastic molding composition as claimed in claim 1, wherein copolyamide A is present in an amount of 10-70% by weight, in which $A_1$ is 85-96% by weight of recurring units derived from adipic acid and hexamethylenediamine and $A_2$ is 4-15% by weight of units derived from ε-caprolactam.

4. A thermoplastic molding composition as claimed in claim 1, wherein copolyamide A is present in an amount of 15-70% by weight, in which $A_1$ is 88-92% by weight of recurring units derived from adipic acid and hexamethylenediamine and $A_2$ is 5-12% by weight of units derived from ε-caprolactam.

5. A thermoplastic molding composition as claimed in claim 1, wherein the impact-modifying rubber (C) is ethylene-propylene rubber.

6. A thermoplastic molding composition as claimed in claim 1, wherein the impact-modifying rubber is an ethylene-propylene-diene rubber.

7. A thermoplastic molding composition as claimed in claim 1, wherein the impact-modifying rubber is a copolymer of ethylene with acrylic acid, methacrylic acid, esters of these acids or mixtures thereof.

8. A thermoplastic molding composition as claimed in claim 1, wherein the impact-modifying rubber is a graft copolymer with butadiene, butadiene/styrene, butadiene/acrylonitrile or acrylic esters.

9. A thermoplastic molding composition as claimed in claim 1, wherein the impact-modifying rubber is an ethylene-propylene rubber containing copolymerized maleic anhydride.

10. A thermoplastic molding composition as claimed in claim 1, wherein the impact-modifying rubber is an ethylene/N-butylacrylate/acrylic acid terpolymer.

11. A thermoplastic molding composition as claimed in any one of claims 1-10, wherein (B) is present in an amount of 10-70% by weight.

12. A thermoplastic molding composition as claimed in any one of claims 1-10, wherein (B) is present in an amount of 15-70% by weight.

* * * * *